US010543677B2

(12) United States Patent
Sano et al.

(10) Patent No.: US 10,543,677 B2
(45) Date of Patent: Jan. 28, 2020

(54) TRANSFER MEMBER FOR TRANSFER-TYPE INKJET RECORDING, INKJET RECORDING METHOD AND INKJET RECORDING APPARATUS

(71) Applicant: CANON KABUSHIKI KAISHA, Tokyo (JP)

(72) Inventors: Tsukasa Sano, Kawasaki (JP); Midori Kushida, Tokyo (JP); Tetsuya Kosuge, Yokohama (JP); Yoshikazu Saito, Inagi (JP); Mitsutoshi Noguchi, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/029,977

(22) Filed: Jul. 9, 2018

(65) Prior Publication Data

US 2019/0016113 A1    Jan. 17, 2019

(30) Foreign Application Priority Data

Jul. 14, 2017   (JP) ................. 2017-138564

(51) Int. Cl.
*B41J 2/005*    (2006.01)
*B41J 2/01*    (2006.01)
(Continued)

(52) U.S. Cl.
CPC ............ *B41J 2/0057* (2013.01); *B41J 2/01* (2013.01); *B41M 5/025* (2013.01); *C09D 11/00* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045;
(Continued)

(56) References Cited

U.S. PATENT DOCUMENTS 9,200,120 B2   12/2015 Dooley et al.
9,354,557 B2    5/2016 Noguchi
(Continued)

FOREIGN PATENT DOCUMENTS

JP   2008-287251 A   11/2008
JP   2014-231223 A   12/2014

OTHER PUBLICATIONS

Extended European Search Report in European Application No. 18183331.0 (Nov. 16, 2018).

*Primary Examiner* — Manish S Shah
(74) *Attorney, Agent, or Firm* — Venable LLP

(57) ABSTRACT

The transfer member for transfer-type inkjet recording of the present invention is formed so that a surface layer includes an organosiloxane compound having a polyalkylene oxide unit and the contact angle of water and the contact angle of hexadecane on the surface are 85° or more and 110° or less and 25° or more and 50° or less, respectively.

10 Claims, 2 Drawing Sheets

(51) Int. Cl.
*C09D 11/00* (2014.01)
*C09D 11/30* (2014.01)
*B41M 5/025* (2006.01)
*B41M 5/03* (2006.01)
*B41N 10/00* (2006.01)
*B41M 5/00* (2006.01)

(52) U.S. Cl.
CPC ......... *C09D 11/30* (2013.01); *B41J 2002/012* (2013.01); *B41M 5/0017* (2013.01); *B41M 5/03* (2013.01); *B41N 10/00* (2013.01)

(58) Field of Classification Search
CPC .............. B41M 5/0011; B41M 5/0017; B41M 5/0047; B41M 7/00; B41M 7/0072; B41M 5/52; B41M 5/5218; B41M 5/025; B41M 5/03; C09D 11/30; C09D 11/00; B41N 10/00
See application file for complete search history.

(56) References Cited

U.S. PATENT DOCUMENTS

| | | | |
|---|---|---|---|
| 9,690,235 B2 | 6/2017 | Noguchi | |
| 9,815,270 B2 | 11/2017 | Saito et al. | |
| 9,815,271 B2 | 11/2017 | Kushida et al. | |
| 10,005,272 B2 | 6/2018 | Noguchi et al. | |
| 2012/0241687 A1* | 9/2012 | Wu | B05D 5/083 |
| | | | 252/511 |
| 2013/0216727 A1* | 8/2013 | Tomo | G02B 1/105 |
| | | | 427/503 |
| 2014/0008584 A1* | 1/2014 | Wu | C08G 73/14 |
| | | | 252/511 |
| 2017/0028710 A1* | 2/2017 | Kushida | B41J 2/0057 |

\* cited by examiner

TRANSFER MEMBER FOR TRANSFER-TYPE INKJET RECORDING, INKJET RECORDING METHOD AND INKJET RECORDING APPARATUS

BACKGROUND OF THE INVENTION

Field of the Invention

The present invention relates to a transfer member for transfer-type inkjet recording, and an inkjet recording method and an inkjet recording apparatus using such a transfer member.

Description of the Related Art

A transfer-type inkjet recording method is known which includes applying an ink onto an image formation surface of a transfer member according to an inkjet method, to form an image, and transferring the image from the image formation surface of a transfer member to a recording medium, to thereby record the image on the recording medium. A method is also proposed which includes applying a reaction liquid (also referred to as a "treatment liquid") that reduce ink fluidity, onto an image formation surface of a transfer member, for the purpose of holding an ink on the transfer member without flowing of any ink applied on the image formation surface of the transfer member. An image formation surface of a transfer member for use in image formation by an ink and a reaction liquid is demanded to have wettability suited for image formation by the ink and the reaction liquid and transferability (image releasability) of an image to a recording medium.

Japanese Patent Application Laid-Open No. 2014-231223 discloses a surface layer of a transfer member, the surface layer including a polymer layer having a network structure made of fluorinated organosiloxane. According to Japanese Patent Application Laid-Open No. 2014-231223, the type and the amount of a precursor for forming the network structure made of fluorinated organosiloxane can be selected to thereby adjust the surface free energy of the surface layer to a value that enables wettability and transferability of an ink to be simultaneously satisfied.

SUMMARY OF THE INVENTION

The present invention is directed to a transfer member for transfer-type inkjet recording, which can be applied to image formation using an acid-containing reaction liquid and an ink and which is enhanced in durability in repeated use. The present invention is directed to an inkjet recording method and an inkjet recording apparatus using the transfer member.

According to one aspect of the present invention, a transfer member for transfer-type inkjet recording, including a surface layer, wherein the surface layer includes an organosiloxane compound having a polyalkylene oxide unit, a contact angle of water on a surface of the transfer member is 85° or more and 110° or less, and a contact angle of hexadecane on the surface of the transfer member is 25° or more and 50° or less, is provided.

According to another aspect of the present invention, an inkjet recording method including:

applying a reaction liquid containing an acid onto an image formation surface of a transfer member;

applying an ink onto the image formation surface of a transfer member, to form an ink image; and transferring the ink image from the transfer member to a recording medium, wherein the transfer member is the transfer member having the above configuration.

The inkjet recording apparatus according to the present invention is an inkjet recording apparatus including:

a transfer member;

an image forming unit including a reaction liquid application apparatus that applies a reaction liquid containing an acid onto an image formation surface of the transfer member, and an ink application apparatus that applies an ink onto the image formation surface of the transfer member to thereby form an ink image; and a transfer unit that transfers the ink image from the transfer member to a recording medium, wherein the transfer member is the transfer member having the above configuration.

Further features of the present invention will become apparent from the following description of exemplary embodiments with reference to the attached drawings.

DESCRIPTION OF THE EMBODIMENTS

Figure 1:
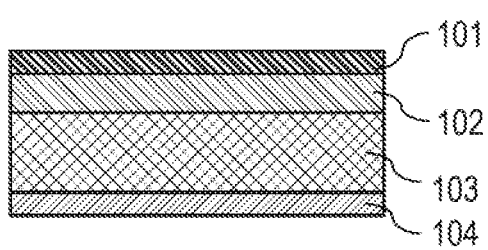
FIG. 1 is a schematic view representing a configuration of a transfer member according to one embodiment of the present invention.

Preferred embodiments of the present invention will now be described in detail in accordance with the accompanying drawings.

In a transfer-type inkjet recording method, a transfer member is desirably used repeatedly for image formation in terms of running cost.

According to studies by the present inventors, however, when image formation on a transfer member is repeatedly performed by use of an acid-containing reaction liquid and an ink, a surface layer of the transfer member may react with the reaction liquid, thereby causing characteristics of the transfer member surface to be impaired to result in deterioration in transferability. The surface layer of a transfer member made of a fluorinated organosilane network structure (fOSN), disclosed in Japanese Patent Application Laid-Open No. 2014-231223, cannot sometimes achieve wettability suited for image formation using an acid-containing reaction liquid.

The present inventors have made intensive studies with respect to such problems, resulting in completion of the present invention. Hereinafter, embodiments of the present invention are described in detail.

The transfer member according to the present invention includes a surface layer. The surface layer has an image formation surface, and an ink image is formed on the image formation surface by an acid-containing reaction liquid and an ink. The ink image formed on the transfer member may be referred to as an "intermediate image".

It is important for the image formation surface (the surface of the transfer member) of the transfer member to have a surface property that allows favorable formation of the ink image and transfer of the ink image to a recording medium to be simultaneously satisfied. In order to form a high-quality ink image on the transfer member, the image formation surface can have wettability that enables uniform coating with the acid-containing reaction liquid as a component for an increase the viscosity of an ink to be made. On the other hand, when image formation is repeatedly performed by use of the same transfer member, the image formation surface of the transfer member can have durability against repeated application of the acid-containing reaction liquid. The present inventors have made studies with respect to physical properties of the image formation surface of the transfer member, and have focused on the behavior of the acid and the ink image on the image formation surface and have found that important physical properties for achievement of image formability and durability of the transfer member, described above, correspond to hydrophilicity and oil repellency in a properly balanced manner of the image formation surface of the transfer member. That is, the present inventors have found that the image formation surface can have hydrophilicity and oil repellency in a properly balanced manner to thereby suppress degradation of a transfer member surface of an ink image from the image formation surface and the surface of the transfer member by an acid-containing component, resulting in an enhancement in durability of the transfer member against repeated application of the acid-containing reaction liquid.

The image formation surface of the transfer member can have higher water repellency for an enhancement in transferability. Such a requirement for higher water repellency is in a trade-off relationship with the above requirement for formation of a high-quality ink image on the image formation surface of the transfer member.

The present inventors have made studies with respect to a relationship between physical properties necessary for the above respective requirements, and have found that hydrophilicity and oil repellency of the image formation surface of the transfer member can be controlled within proper ranges to thereby allow the above respective requirements to be satisfied. The present invention is based on such findings by the present inventors, and such control of hydrophilicity and oil repellency within proper ranges has been achieved in the present invention by allowing a surface layer to include an organosiloxane compound having a polyalkylene oxide unit and forming the surface (image formation surface) of the transfer member so that the contact angle of water and contact angle of hexadecane are 85° or more and 110° or less and 25° or more and 50° or less, respectively. The image formation surface can be adjusted so that the respective contact angles falling within such ranges are obtained, thereby allowing surface degradation due to the acid in the reaction liquid to be further suppressed. Furthermore, the contact angle of water is preferably 85° or more and 100° or less, more preferably 88° or more and 100° or less. In addition, the contact angle of hexadecane is preferably 25° or more and 45° or less, more preferably 25° or more and 42° or less. Preparation can be made so that the respective contact angles falling within such ranges are obtained, thereby allowing a high-quality image to be formed on the transfer member.

Hereinafter, the present invention will be described in detail with reference to suitable embodiments. Herein, an inkjet recording apparatus provided with a transfer member may be hereinafter conveniently referred to as a "transfer-type inkjet recording apparatus" and an inkjet recording method using a transfer member may be hereinafter conveniently referred to as a "transfer-type inkjet recording method". In addition, a transfer member for transfer-type inkjet recording may be simply referred to as a "transfer member".

<Transfer Member>

The transfer member according to the present invention includes at least a surface layer having an image formation surface. The transfer member can also further include, for example, a base layer for imparting a strength necessary for handling and securement to a transfer unit, to the transfer member.

The base layer is not particularly limited as long as the base layer can support the surface layer having an image formation surface and can impart required mechanical strength and physical properties to the transfer member, and the base layer can include at least one layer of an elastic layer, a compression layer and a reinforcement layer. The base layer may also be formed from a plurality of layers. A base layer made of a plurality of layers may have a structure obtained by producing respective layers and bonding the resulting layers by an intermediate layer such as an adhesion layer, or may have a layered structure obtained by previously preparing or forming a layer, forming the next layer thereon and integrating the resultant. Alternatively, the base layer may have both the two structures.

FIG. 1 schematically illustrates the configuration of the transfer member of the present embodiment by a partial cross-sectional view in the thickness direction. The transfer member illustrated has a structure where a surface layer 101, and an elastic layer 102, a compression layer 103 and a reinforcement layer 104 each serving as a base layer are stacked in the listed order. Herein, the reinforcement layer, the compression layer and the surface layer may be integrated.

Figure 2:
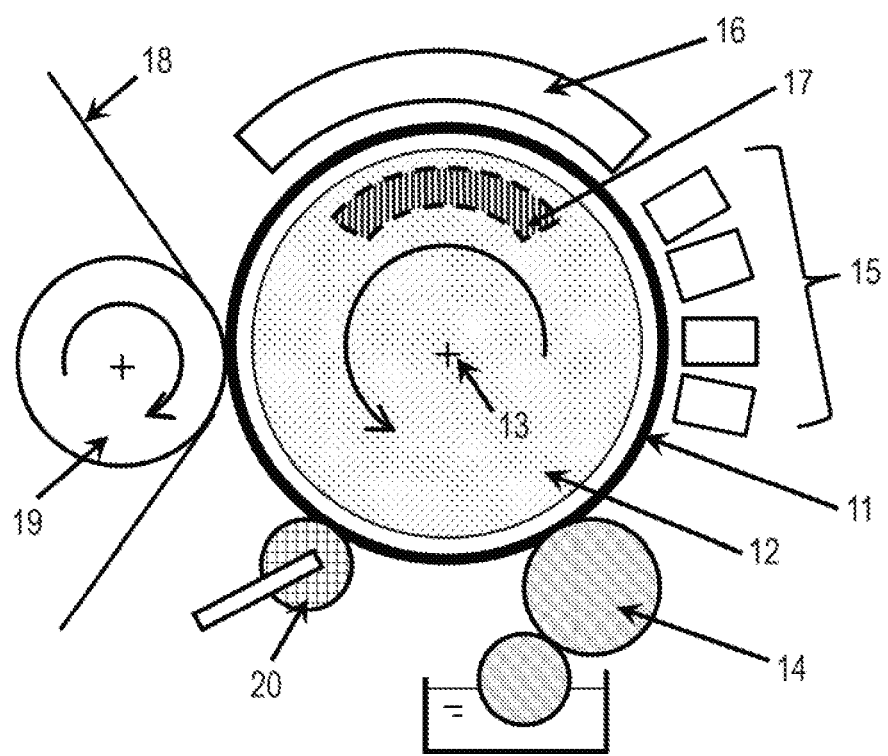
FIG. 2 is a schematic view representing an inkjet recording apparatus for use in an inkjet recording method according to one embodiment of the present invention.

Examples of the shape of the transfer member can include a sheet shape, a roller shape, a drum shape, a belt shape and an endless web shape. The size of the transfer member can be appropriately set according to the size of the recording medium. In particular, when a drum-shaped transfer member as in an embodiment of FIG. 2 is used, continuous and repeated use of the same transfer member is facilitated and a suitable configuration is achieved also from the viewpoint of productivity.

(Supporting Member)

A supporting member can be, if necessary, used for imparting a conveyance property and mechanical durability to the transfer member. The supporting member supports a surface (a surface located closer to the reinforcement layer 104) of the transfer member, the surface being located opposite to the surface layer.

The supporting member is required to have a strength to some extent from the viewpoint of conveyance accuracy and durability. The material of the supporting member can be a metal, ceramics, a resin or the like. In particular, aluminum, iron, stainless steel, an acetal resin, an epoxy resin, polyimide, polyethylene, polyethylene terephthalate, nylon, polyurethane, silica ceramics or alumina ceramics can be adopted. The supporting member can be configured from the material selected therefrom, thereby ensuring rigidity and dimension accuracy that can withstand pressure in transfer and also reducing the inertia in operation, to result in an enhancement in control responsiveness. Herein, such materials can be used singly or in combinations of two or more kinds thereof.

The shape and the structure of the supporting member may be set so that the transfer member can be supported, and are not particularly limited. For example, the shape of the supporting member can be any shape such as a roller shape, a drum shape or a belt shape according to the form of an inkjet recording apparatus to which the supporting member is applied, the transfer mode to the recording medium, the shape of the transfer member, and the like. In an inkjet recording apparatus illustrated in FIG. 2 described below, a drum-shaped transfer member is formed by providing a transfer member on the outer periphery of a drum-shaped supporting member.

(Reinforcement Layer)

The reinforcement layer can be used in order to enhance conveyance accuracy and mechanical durability of the transfer member. The reinforcement layer can be contacted with the supporting member. The reinforcement layer 104 is required to have a strength to some extent from the viewpoint of conveyance accuracy and durability. The reinforcement layer 104 can be formed by a fabric, a film, a sheet or the like. Examples of the material of the fabric include cotton, polyester, polyimide and nylon. Examples of the material of the film include polyethylene terephthalate and polyimide. The thickness of the reinforcement layer is not particularly limited and may be set so that a reinforcement layer having an objective reinforcement function can be obtained. For example, the thickness of the reinforcement layer can be 0.1 mm or more and 1.5 mm or less. Further, the transfer member may contain an additional reinforcement layer between the compression layer and the elastic layer (second reinforcement layer) aside from the reinforcement layer contacting with the supporting member (first reinforcement layer).

(Compression Layer)

The compression layer 103 can be used in order to homogenize the pressure (transfer pressure) applied to the transfer member in transfer. The compression layer 103 can have rubber (sponge rubber) encapsulating a void therein. The void may be here configured from either an open cell or a closed cell and can be configured from a closed cell from the viewpoint of a recovery property from deformation of the compression layer due to the transfer pressure. The rubber can be polybutadiene-type rubber, nitrile-type rubber, chloroprene-type rubber, silicone-type rubber, fluororubber, fluorosilicone-type rubber, urethane-type rubber, a styrene-type elastomer, an olefin-type elastomer, a vinyl chloride-type elastomer, an ester-type elastomer or an amide-type elastomer. Such rubbers can be used singly or in combinations of two or more kinds thereof, to form the compression layer. The thickness of the compression layer is preferably 0.1 mm or more and 2.0 mm or less, more preferably 0.2 mm or more and 2.0 mm or less from the viewpoint of homogenization of the transfer pressure and suppression of distortion of the transfer member in the movement direction in transfer.

(Elastic Layer)

The elastic layer 102 can be used in order to enhance followability of the transfer member towards the recording medium. As the material forming the elastic layer 102, various materials such as a resin, an elastomer, rubber and ceramic can be appropriately used. Such materials can be used singly or in combinations of two or more kinds thereof.

Various elastomers and various rubbers can be adopted in terms of a processing property. Specific examples of such rubbers include silicone rubber, fluororubber, chloroprene rubber, urethane rubber, nitrile rubber, ethylene-propylene rubber, natural rubber, styrene rubber, isoprene rubber, butadiene rubber, ethylene-propylene-diene rubber and nitrile/butadiene rubber (acrylonitrile-butadiene rubber). Such rubbers can be used singly or in combinations of two or more kinds thereof. In particular, silicone rubber, fluororubber and ethylene-propylene-diene rubber can be adopted also in terms of transferability because of being small in the change in elastic modulus due to the temperature. Accordingly, the surface layer preferably includes at least one of acrylonitrile-butadiene rubber, silicone rubber, fluororubber and ethylene-propylene-diene rubber, more preferably includes at least one of silicone rubber, fluororubber and ethylene-propylene-diene rubber.

The elastic layer preferably contains 10% by mass or more and 100% by mass or less of such resin, ceramic and rubber in total based on the total mass of the elastic layer. The elastic layer more preferably contains 30% by mass or more of such resin, ceramic and rubber in total, further preferably 50% by mass or more of such resin, ceramic and rubber in total. The elastic layer may contain various fillers and/or additives other than the above materials.

The compressive elastic modulus $E_2$ of the elastic layer is 0.5 MPa or more and 50 MPa. The compressive elastic modulus $E_2$ of the elastic layer is more preferably 3.0 MPa or more and 25.0 MPa or less, particularly preferably 5.0 MPa or more and 25.0 MPa or less. The compressive elastic modulus $E_2$ is 0.5 MPa or more, thereby easily suppressing large deformation of the elastic layer, to allow the surface layer to be followed towards deformation of the elastic layer. The compressive elastic modulus $E_2$ is 50.0 MPa or less, thereby enabling the stress locally applied to the surface layer particularly at a high speed to be sufficiently relaxed by the elastic layer, and also enabling cracking resistance and transferability to be enhanced.

The thickness of the elastic layer can be 0.05 mm or more and 0.5 mm or less from the viewpoint of allowing the function of the elastic layer to be effectively exerted. Furthermore, the upper limit of the thickness of the elastic layer can be 0.2 mm or less.

(Surface Layer)

The surface layer 101 has a function as a layer having an image formation surface for forming an ink image. An image formation surface is provided on at least one portion of an opening surface of the surface layer 101. The image formation surface is formed as a surface that satisfies the contact angle of water and the contact angle of hexadecane falling within the above-listed ranges, respectively, in order to achieve a surface property suitable for formation of an ink image and transfer to a recording medium.

As an organosiloxane compound having a siloxane unit included in the surface layer that forms the image formation surface, a condensate of an organosilane compound, having a siloxane bond, can be used.

Examples of the organosilane compound for providing the condensate can include a hydrolyzable organosilane compound having a hydrolyzable group and a non-hydrolyzable hydrocarbon group, and a hydrolyzable organosilane compound having a hydrolyzable group and a non-hydrolyzable polymerizable group. At least one of such compounds can be used to provide a composition for condensate formation. Herein, the hydrolyzable organosilane compound having a polymerizable group can be used to thereby perform polymerization or crosslinking of the condensate depending on the type of the polymerizable group, providing a layer formed by the condensate, having an objective hardness. In order to impart flexibility to the condensate of an organosilane compound, a compound having a flexible group and a polymerizable group can be appropriately added. When the polymerizable group is a photo-polymerizable group, a coating liquid in which the condensate and a photo-polymerization initiator are compounded can be prepared and a coating layer can be irradiated with light, thereby providing a layer of a photo-cured product of the condensate.

Examples of the hydrolyzable organosilane compound having a hydrolyzable group and a non-hydrolyzable hydrocarbon group for condensate formation can include at least one compound of the following general formula (1).

$$(R^{30})_t\text{—Si—}(R^{31})_{(4-t)} \quad \text{General formula (1)}$$

(wherein $R^{30}$ represents a non-hydrolyzable hydrocarbon group, $R^{31}$ represents a hydrolyzable group and t represents an integer of 1 to 3.)

Examples of the non-hydrolyzable hydrocarbon group can include alkyl group, alicyclic hydrocarbon group and aromatic hydrocarbon group. Examples of the non-hydrolyzable alkyl group can include an alkyl group having 1 to 10 carbon atoms, optionally substituted with a fluorine atom. When the non-hydrolyzable alkyl group is substituted with fluorine, all hydrogen atoms of the alkyl group can be each substituted with fluorine.

Examples of the hydrolyzable group can include an alkyloxy group, and examples of the alkyl group of the alkyloxy group can include a methyl group and an ethyl group.

Specific examples of the compound of the general formula (1) can include the following respective compounds:
methyltrimethoxysilane, methyltriethoxysilane, dimethyldimethoxysilane, dimethyldiethoxysilane, diethyldiethoxysilane, trimethylmethoxysilane, trimethylethoxy silane, propyltrimethoxysilane, propyltriethoxysilane, hexyltrimethoxysilane, hexyltriethoxysilane, decyltrimethoxysilane, decyltriethoxysilane, cyclopentylmethyldimethoxysilane, cyclopentylmethyldiethoxysilane, cyclohexylmethyldimethoxysilane, cyclohexylmethyldiethoxysilane, dicyclopentyldiethoxysilane, dicyclohexyldiethoxysilane, phenylmethyldimethoxysilane, phenylmethyldiethoxysilane, phenyltrimethoxysilane, phenyltriethoxysilane, diphenyldiethoxysilane, trimethoxy(3,3,3-trifluoropropyl)silane, triethoxy (1H,1H,2H,2H-nonafluorohexyl)silane and triethoxy-1H,1H,2H,2H-tridecafluoro-n-octylsilane.

Examples of the hydrolyzable silane compound having a hydrolyzable group and a non-hydrolyzable polymerizable group for condensate formation can include a compound represented by the following general formula (2).

$$(R^{42})\text{—Si—}(R^{44})_{(3-u)} \\ \quad | \\ \quad (R^{43})_u \quad \text{General formula (2)}$$

(wherein $R^{42}$, $R^{43}$ and $R^{44}$ represent a non-hydrolyzable polymerizable group, a non-hydrolyzable alkyl group and a hydrolyzable group, respectively, and u represents an integer of 0 to 2.)

Examples of the non-hydrolyzable polymerizable group can include a group having a vinyl group, or a group having a cyclic ether group such as an epoxy group or an oxetanyl group.

Examples of the non-hydrolyzable alkyl group can include an alkyl group having 1 to 10 carbon atoms.

Examples of the hydrolyzable group can include an alkyloxy group, and examples of the alkyl group of the alkyloxy group can include a methyl group and an ethyl group.

Specific examples of the compound of the general formula (2) can include the following respective compounds:
glycidoxypropyltrimethoxysilane, glycidoxypropyltriethoxysilane, glycidoxypropylmethyldimethoxysilane, glycidoxypropylmethyldiethoxysilane, glycidoxypropyldimethylmethoxysilane, glycidoxypropyldimethylethoxysilane, 2-(epoxycyclohexyl) ethyltrimethoxysilane, 2-(epoxycyclohexyl) ethyltriethoxysilane and a compound where an epoxy group of each of the above compounds is substituted with an oxetanyl group; and acryloxypropyltrimethoxysilane, acryloxypropyltriethoxysilane, acryloxypropylmethyldimethoxysilane, acryloxypropylmethyldiethoxysilane, acryloxypropyldimethylmethoxysilane, acryloxypropyldimethylethoxysilane, methacryloxypropyltrimethoxysilane, methacryloxypropyltriethoxysilane, methacryloxypropylmethyldimethoxysilane, methacryloxypropylmethyldiethoxysilane, methacryloxypropyldimethylmethoxysilane and methacryloxypropyldimethylethoxysilane.

When at least one compound of general formulae (1) and (2) is used, the compounding ratio thereof is preferably selected from 0:100 to 90:10 (molar ratio) of the compound of general formula (1): the compound of general formula (2). In particular, the organosiloxane compound is more preferably condensed at a compounding ratio of the compound of general formula (1): the compound of general formula (2) of 70:30 to 50:50 (molar ratio), thereby enabling durability to be enhanced.

Examples of a unit that imparts flexibility include a polyalkylene oxide (PAO) unit, a polybutadiene unit and a polyalkylene unit. A polymerizable compound having such a unit can be added to thereby impart elasticity to the condensate of organosiloxane that forms the image formation surface, resulting in an enhancement in durability of the image formation surface. Furthermore, a polymerizable compound having polyalkylene oxide (PAO) can be used, thereby allowing image formability to be enhanced by hydrophilicity of such a polyalkylene oxide (PAO) unit. The polyalkylene oxide unit can be a structure represented by the following formula (I) from the viewpoint of an enhancement in flexibility.

$$\text{—}(\text{—}(CH_2)_m\text{—}O)_n\text{—} \quad (I)$$

wherein m represents 4 to 12 and n represents 1 to 120.

As a compound having a polymerizable group that imparts flexibility, at least one of the following compounds (1) to (16) can be used.
(1) bis[(3-methyldimethoxysilyl)propyl]polyethylene oxide
(2) bis[(3-methyldimethoxysilyl)propyl]polypropylene oxide
(3) bis[3-(triethoxysilylpropoxy)-2-hydroxypropoxy]polyethylene oxide
(4) bis[N,N'-(triethoxysilylpropyl)aminocarbonyl]polyethylene oxide
(5) bis(triethoxysilylpropyl)polyethylene oxide
(6) 1,3-[bis(3-triethoxysilylpropyl)polyethyleneoxy]-2-methylenepropane
(7) 2-[acetoxy(polyethyleneoxy)propyl]triethoxysilane
(8) 2-[methoxy(polyethyleneoxy)propyl]trimethoxysilane
(9) methoxytriethyleneoxypropyltrimethoxysilane
(10) N-(triethoxysilylpropyl)-O-polyethylene oxide urethane
(11) [hydroxy(polyethyleneoxy)propyl]triethoxysilane
(12) Denacol EX-830 (trade name, Nagase ChemteX Corporation)
(13) Denacol EX-861 (trade name, Nagase ChemteX Corporation)
(14) Denacol EX-931 (trade name, Nagase ChemteX Corporation)
(15) Denacol EX-991L (trade name, Nagase ChemteX Corporation)

(16) Denacol EX-212P (trade name, Nagase ChemteX Corporation)

The above compounds (12) to (16) are polymerizable compounds having polyalkyleneoxide (PAO). The compounds (12) to (16) have two epoxy groups as a polymerizable group.

A hydrolyzable organosilane compound for condensate formation can include at least one of a hydrolyzable organosilane compound having a perfluoroalkyl group, as the compound of general formula (1), and a hydrolyzable organosilane compound having an epoxy group, as the compound of general formula (2). Additionally, a compound having a polymerizable group, to which a flexible group is introduced, can be used in combination. That is, the image formation surface of the transfer member desirably includes a condensate of a hydrolyzable organosiloxane having a siloxane bond and an epoxy group and a condensate of organosiloxane, in which the compound having a polymerizable group that imparts flexibility is condensed. The compounding rate of the compound having a polymerizable group that imparts flexibility can be selected from 95:5 to 20:80 (molar ratio) of ((compound of general formula (1))+(compound of general formula (2))):(compound having polymerizable group that imparts flexibility).

(Method for Producing Condensate)

A condensation reaction for producing the condensate of an organosilane compound (organosiloxane compound) can be performed by allowing hydrolysis, if necessary, and the condensation reaction to progress by heating in the presence of water. As a result, a siloxane bond is formed. An organosilane compound as a monomer for providing an objective condensate can be selected, and hydrolysis, if necessary, and the condensation reaction can be appropriately controlled by the temperature, the time, the pH and the like, thereby achieving desired degree of condensation and surface physical properties. An acid catalyst, an alkaline catalyst or the like may also be used. The degree of progression of the condensation reaction (the degree of condensation and the number of siloxane bond(s)) can be defined as the ratio of the number of functional groups condensed, to the number of condensable functional groups, and can be estimated by a known method using Si-NMR measurement.

The degree of condensation varies depending on the type and the synthesis condition of the organosilicon compound, and too low a degree of condensation may have any effect on coatability, film formability and the like. Therefore, the degree of condensation is preferably 20% or more. Furthermore, the degree of condensation is more preferably 30% or more from the viewpoints of coatability and film formability, and, in particular, the degree of condensation is suitably controlled within the range of 50% or more and 70% or less also from the viewpoint of acid resistance.

(Method for Forming Surface Layer)

The surface layer can be formed with the material and the forming method being selected so that physical properties with respect to the contact angle of each of water and hexadecane, falling within the above-listed range, can be imparted to the image formation surface. In order to impart objective physical properties with respect to the above contact angles to the image formation surface of the surface layer of the transfer member, the surface (for example, the surface of the elastic layer) before formation of the surface layer may be subjected to surface treatment and then used. Examples of the surface treatment include frame treatment, corona treatment, plasma treatment, polishing treatment, roughening treatment, active energy ray irradiation treatment, ozone treatment, surfactant treatment and silane coupling treatment. A plurality of such treatments may be combined and applied. The thickness of the surface layer can be 0.001 mm or more and 0.020 mm or less.

<Inkjet Recording Method>
<Image Formation Step>

An image formation step includes a reaction liquid application step of applying a reaction liquid to an image formation surface of a transfer member and an ink application step of applying an ink to the image formation surface of a transfer member to thereby form an ink image.

Application of the reaction liquid can be performed at least one of before ink application and after ink application. The ink and the reaction liquid are applied to the image formation surface of a transfer member so as to be at least partially overlapped. In order to more effectively increase the viscosity of an ink by the reaction liquid, the ink can be applied to the image formation surface of a transfer member, to which the reaction liquid is applied.

(Reaction Liquid)

The reaction liquid contains an acid. An acid can increase the viscosity of an ink. Therefore, the acid may be hereinafter designated as a "component for an increase in the ink viscosity". The phrase "increase in the ink viscosity" means a case where a color material, a resin and the like forming such an ink are brought into contact with the component for an increase in the ink viscosity and thus chemically react therewith or physically adsorb thereto to allow an increase in the viscosity of the entire ink to be observed. The phrase encompasses not only the case, but also a case where a part of an ink composition, such as a color material, aggregates to thereby result in a local increase in the viscosity. Herein, the "reaction" of the "reaction liquid" encompasses not only the occurrence of a chemical reaction with the ink, but also the occurrence of physical action (adsorption or the like). The component for an increase in the ink viscosity has an effect of reducing fluidity of a part of the ink and/or the ink composition on the transfer member to suppress bleeding and beading in image formation.

In the present embodiment, an acid is used in the component for an increase in the ink viscosity, and a polyvalent metal ion, a porous fine particle or the like may also be used in combination. A plurality of the components for an increase in the ink viscosity are also suitably contained. Herein, the content of the component for an increase in the ink viscosity in the reaction liquid can be 5% by mass or more based on the total mass of the reaction liquid.

Specific examples of an organic acid that can be used as the component for an increase in the ink viscosity include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxysuccinic acid and dioxysuccinic acid, and examples of an inorganic acid that can be used include hydrochloric acid, phosphoric acid, sulfuric acid, nitric acid and boric acid. Such acids can be used in the component for an increase in viscosity, singly or in combinations of two or more kinds thereof.

The reaction liquid may contain a proper amount of water or an organic solvent. The water here used can be water deionized by ion exchange or the like. The content of the water in the reaction liquid can be 50 to 85% by mass based on the total mass of the reaction liquid. The organic solvent that can be used in the reaction liquid is not particularly limited, and any known organic solvent can be used.

Various resins can also be added to the reaction liquid. For example, an appropriate resin can be suitably added to the reaction liquid to thereby impart favorable adhesiveness of an ink image to a recording medium in transfer and/or enhance mechanical strength of a final image. The material for use in the resin is not particularly limited as long as the material can coexist with the component for an increase in the ink viscosity. Any material that can coexist with the component for an increase in the ink viscosity may be selected from a resin and a resin fine particle that can be used for an ink described below, and may be used.

A surfactant and/or a viscosity modifier can be added into the reaction liquid to appropriately adjust the surface tension and the viscosity of the reaction liquid. The surface energy of the reaction liquid is adjusted to 50 mN/m or less, preferably 20 mN/m to 40 mN/m, more preferably 20 mN/m or less.

The material here used is not particularly limited as long as the material can coexist with the component for an increase in the ink viscosity. Examples of a surfactant specifically used include Megafac F-444 (trade name, produced by DIC Corporation), and in particular, a fluorine-based surfactant can be contained.

The term "fluorine-based surfactant" means a compound having at least a hydrophobic fluorocarbon chain and a hydrophilic molecular chain (hydrophilic moiety) in the molecular structure. The surfactant contains a hydrophobic fluorocarbon chain to thereby exhibit excellent surface tension reduction ability as described above.

In particular, a nonionic surfactant is suitably used which has a fluoroalkyl chain in the hydrophobic moiety and an ethylene oxide chain in the hydrophilic moiety. The surfactant has a fluoroalkyl chain in the hydrophobic moiety and an ethylene oxide chain in the hydrophilic moiety, and therefore is high in compatibility with a solvent and a reaction agent and thus exhibits excellent solubility even if having a composition reduced in the water content due to drying or the like, thereby enabling uniformity and surface tension reduction ability of a reaction liquid layer to be kept.

In addition, the surfactant can be such a nonionic surfactant to thereby maintain characteristics thereof without any change in the structure even after the reaction with the ink composition, and therefore enables uniformity and surface tension reduction ability of a reaction liquid layer to be kept.

Examples of the fluorine-based surfactant suitably used herein include FSO100, FSN100 and FS3100 (trade name, produced by DuPont), and F444, F477 and F553 (trade name, produced by DIC Corporation), and the content of the fluorine-based surfactant based on the total mass of the reaction liquid can be 1% by mass or more and 10% by mass or less.

(Application of Reaction Liquid (Reaction Liquid Application Step))

Various procedures conventionally known can be appropriately used in the reaction liquid application step of applying the reaction liquid to the image formation surface of the transfer member. Specific examples include die coating, blade coating, a procedure using a gravure roller, a procedure using an offset roller, and spray coating. A method for applying by use of an inkjet device is also suitable. A combination with a plurality of further some methods is also extremely suitable.

(Formation of Ink Image (Ink Application Step))

The ink application step of applying an ink to the image formation surface of the transfer member, with which the reaction liquid is coated, forms an ink image on the image formation surface of the transfer member. The ink is applied in the ink application step so as to be at least partially overlapped with a region where the reaction liquid is applied to the transfer member.

For example, an inkjet device can be used in such ink application. Examples of a mode of the inkjet device can include the following modes:

a mode where the ink is discharged by using an electrothermal transducer to allow film boiling to occur in the ink, to form air bubbles;

a mode where the ink is discharged by an electromechanical transducer; and a mode where the ink is discharged by use of static electricity.

Any of various inkjet devices proposed for an inkjet liquid discharge technique as described above can be used. In particular, a mode by use of an electrothermal transducer is suitably used from the viewpoint of printing at a high speed and a high density.

The mode of the entire inkjet device is not particularly limited. For example, the following inkjet heads can be used:

an inkjet head in the form of a so-called shuttle where recording is performed with the head being scanned perpendicular to the traveling direction of the transfer member; and an inkjet head in the form of a so-called line head where an ink discharge port is linearly disposed substantially perpendicular to the traveling direction of the transfer member (namely, substantially in parallel with the axis direction in the case where the transfer member has a drum shape).

(Ink)

Hereinafter, each component that can be used in the ink will be described.

(1) Color Material

In the ink, a color material where known dye, carbon black, organic pigment and the like are dissolved and/or dispersed can be used. In particular, various pigments are suitable because of providing a durable and high-quality print.

(2) Pigment

The ink can contain at least one of a pigment and a dye in the color material. The dye and the pigment are not particularly limited, and can be selected from a dye and a pigment that can be used in the color material of the ink and can be used in a required amount. For example, known dye, carbon black, organic pigment and the like can be used in an inkjet ink. A dye and/or a pigment dissolved and/or dispersed in a liquid medium can be used. In particular, various pigments are suitable because a print has characteristics such as durability and high-quality, and the ink can include at least a pigment as the color material. The pigment that can be used in the ink is not particularly limited, and a known inorganic pigment/organic pigment can be used. Specifically, a pigment represented by the C.I. (color index) number can be used. Carbon black can be used as a black pigment. The content of the pigment in the ink is preferably 0.5% by mass or more and 15.0% by mass or less, more preferably 1.0% by mass or more and 10.0% by mass or less based on the total mass of the ink.

(3) Pigment Dispersant

Any dispersant can be used as a dispersant for dispersion of the pigment as long as such a dispersant can be used for a conventionally known inkjet ink. In particular, a water-soluble dispersant having both of a hydrophilic moiety and a hydrophobic moiety in the molecular structure can be used. In particular, a pigment dispersant including a resin which includes at least a hydrophilic monomer and a hydrophobic monomer and which is obtained by copolymerization can be used. Each component here used is not particularly limited, and a conventionally known component is suitably used. Specific examples of the hydrophobic monomer include styrene, a styrene derivative, alkyl (meth)acrylate and benzyl (meth)acrylate. Examples of the hydrophilic monomer include acrylic acid, methacrylic acid and maleic acid.

The acid value of the dispersant can be 50 mgKOH/g or more and 550 mgKOH/g or less. The weight average molecular weight of the dispersant can be 1000 or more and 50000 or less. The mass ratio of the pigment and the dispersant in the ink can be in the range from 1:0.1 to 1:3.

Suitably, no dispersant is used and a so-called self-dispersible pigment where the pigment by itself is subjected to surface modification and is thus dispersible is used in another mode of the ink.

(4) Resin Fine Particle

The ink can contain various particles having no color material. In particular, a resin fine particle is suitable because of having an effect of enhancement of image quality and fixability in some cases. The material of the resin fine particle is not particularly limited and a known resin can be appropriately used. Specific examples include homopolymers such as polyolefin, polystyrene, polyurethane, polyester, polyether, polyurea, polyamide, polyvinyl alcohol, poly(meth)acrylic acid and a salt thereof, polyalkyl (meth)acrylate, and polydiene, or copolymers where a plurality of such homopolymers are combined. The mass average molecular weight of the resin is suitably in the range of 1,000 or more and 2,000,000 or less. The content of the resin fine particle in the ink is preferably 1% by mass or more and 50% by mass or less, more preferably 2% by mass or more and 40% by mass or less based on the total mass of the ink.

Furthermore, the resin fine particle can be used as a resin fine particle dispersion dispersed the ink. A dispersion method is not particularly limited and a so-called self-dispersion type resin fine particle dispersion in which a resin obtained by homopolymerization of a monomer having a dissociable group or copolymerization of a plurality of such monomers is dispersed. Examples of the dissociable group include a carboxyl group, a sulfonic acid group and a phosphoric acid group, and examples of the monomer having such a dissociable group include acrylic acid and methacrylic acid. In addition, a so-called emulsion dispersion type resin fine particle dispersion in which a resin fine particle is dispersed by an emulsifier can also be again suitably used. A known surfactant is suitably used as the emulsifier here mentioned, regardless of whether the molecular weight thereof is low or high. The surfactant is suitably a nonionic surfactant or a surfactant having the same charge as in the resin fine particle. The resin fine particle dispersion desirably has a dispersion particle size of 10 nm or more and 1000 nm or less, further desirably a dispersion particle size of 100 nm or more and 500 nm or less.

Various additives can also be added for stabilization in production of the resin fine particle dispersion. As such additives, for example, n-hexadecane, dodecyl methacrylate, stearyl methacrylate, chlorobenzene, dodecylmercaptan, olive oil, a blue dye (blueing: Blue 70) and polymethyl methacrylate are suitable.

(5) Surfactant

The ink may include a surfactant. Specific examples of the surfactant include Acetylenol EH (trade name, produced by Kawaken Fine Chemicals Co., Ltd.). The content of the surfactant in the ink can be 0.01% by mass or more and 5.0% by mass or less based on the total mass of the ink.

(6) Water and Water-Soluble Organic Solvent

The ink can include water and/or a water-soluble organic solvent in a liquid medium. Such water can be water deionized by ion exchange or the like. As the liquid medium of an aqueous ink, water or an aqueous liquid medium including a mixture of water and a water-soluble organic solvent can be used. The aqueous ink can be obtained by adding a color material to the aqueous liquid medium. The content of water in the aqueous ink is preferably 30% by mass or more and 97% by mass or less, more preferably 50% by mass or more and 95% by mass or less based on the total mass of the ink. The type of the water-soluble organic solvent for use in the ink is not particularly limited, and any known organic solvent can be used. Specific examples include glycerin, diethylene glycol, polyethylene glycol and 2-pyrrolidone. The content of the water-soluble organic solvent in the ink can be 3% by mass or more and 70% by mass or less based on the total mass of the ink.

(7) Other Additives

The ink may contain, if necessary, various additives such as a pH adjuster, a corrosion inhibitor, a preservative, a mildew-proofing agent, an oxidation inhibitor, a reduction inhibitor, a water-soluble resin and a neutralizer thereof, and a viscosity modifier, in addition to the above components.

(Transfer of Ink Image (Transfer Step))

After formation of the ink image, the image formation surface of the transfer member, having the ink image, is pressed on a recording medium to transfer the ink image to the recording medium, thereby providing a final image, in a transfer step. Herein, the "recording medium" refers to not only paper used in common printing, widely but also a fabric, a plastic, a film, other printing media and a recording medium.

The method for pressing the transfer member to the recording medium is not particularly limited, and a method including applying pressure to the transfer member and the recording medium by use of a pair of pressing rollers from both sides is suitable because of efficiently transferring and forming an image. Such pressure is suitably applied stepwisely because such application is effective for a reduction in transfer failure in some cases.

(Liquid Component Removal Step)

A step (liquid component removal step) of decreasing a liquid component from the ink image formed on the image formation surface of the transfer member can also be provided. An excessive liquid component of the ink image can cause an excessive liquid to be spread out or poured out in the transfer step, thereby resulting in image turbulence and transfer failure. Any of various procedures conventionally used can be suitably applied as the procedure for removal of the liquid component from the ink image. For example, any of a method by heating, a method including blowing low-humidity air, a method by pressure reduction, a method including contacting an absorber or a procedure where such methods are combined is suitably used. Air drying can also be performed.

(Heating Step)

A heating step of heating the ink image on the transfer member may be provided as a heating step that is the next step to the ink application step.

Examples of the heating apparatus for use in the heating step can include a heating apparatus by heat generation of a heater or the like and a heating apparatus by irradiation with infrared light or near-infrared light.

The heating step may double as the liquid component removal step described above.

In the case of an ink image that is enhanced in transferability by heating, the ink image can be transferred by heating the ink image and pressing the ink image on the recording medium in the state where the temperature (transfer temperature) is kept at a temperature suitable for transfer, in the transfer step.

The heating temperature can be 70° C. or more and 120° C. or less from the viewpoints of an enhancement in transferability of the ink image by heating and an enhancement in durability of the transfer member by heat.

When the inkjet recording method includes the heating step, the transfer member can be one for heating transfer.

(Cleaning Step)

As described above, in one example of the image recording method of the present invention, image formation is completed by application of the reaction liquid, formation and transfer of the ink image by application of the ink, and removal of the liquid component from the ink image, added if necessary. The transfer member, however, may be repeatedly and continuously used from the viewpoint of productivity, and a cleaning step of cleaning the image formation surface can be here performed before formation of the next ink image is performed. Any various procedures conventionally used can be suitably used as the method for cleaning the image formation surface of the transfer member, and for example, any methods described below can be suitably used:

- a method including applying a washing liquid onto the surface of the transfer member in a shower manner;
- a method including performing sweep away with a wetted Morton roller being abutted with the surface of the transfer member;
- a method including bringing the surface of the transfer member into contact with a washing liquid surface;
- a method including subjecting the surface of the transfer member to scraping off by a wiper blade; and
- a method including applying various energies to the surface of the transfer member.

A procedure where such methods are combined is also suitable.

The image formation surface of the transfer member can have the contact angle of water and the contact angle of hexadecane each falling within a specified range and can exhibit proper hydrophilicity and oil repellency, thereby allowing the acid applied as a component of the reaction liquid to be transferred to the recording medium in transfer of the ink image and effectively decreased and removed from the image formation surface. Furthermore, the image formation surface of the transfer member can exhibit proper hydrophilicity and oil repellency, thereby allowing the remaining component including the acid to be easily removed from the image formation surface by cleaning, and the cleaning step can be performed to thereby effectively remove the remaining acid even in the case where the acid remains on the image formation surface.

(Fixing Step)

A fixing step of heating and pressing the recording medium, on which an image is recorded, to thereby increase fixability of the recording medium and the image may be performed after transfer.

<Inkjet Recording Apparatus>

The inkjet recording apparatus according to the present invention includes a transfer member and an image forming unit. The image forming unit includes a reaction liquid application apparatus that applies a reaction liquid to an image formation surface of a transfer member and an ink application apparatus that applies an ink to the image formation surface of a transfer member to form an ink image.

Furthermore, the inkjet recording apparatus according to the present invention may include a heating apparatus that heats the ink image on the transfer member.

FIG. 2 is a schematic view illustrating a schematic configuration of one embodiment of the inkjet recording apparatus according to the present invention.

A transfer-type inkjet recording apparatus illustrated in the drawing includes a transfer member 11 supported by a supporting member 12, a reaction liquid application apparatus 14, an ink application apparatus 15, an air-blowing apparatus 16, a heating apparatus 17, a pressing roller (pressing member) 19 and a cleaning unit 20.

A transfer member having the configuration illustrated in FIG. 1 is used as the transfer member 11.

The transfer member 11 is disposed on the outer periphery of a rotatable drum-shaped supporting member 12. The transfer member 11 is rotatably driven in an arrow direction around a rotation axis 13, and respective apparatuses circumferentially disposed are operated in synchronization with such rotation, to perform formation of a final image on a recording medium by formation and transfer of an ink image. When the drum-shaped transfer member 11 of the present embodiment is used, the same transfer member 11 is easily repeatedly continuously used and an extremely suitable configuration is provided also in terms of productivity. The image forming unit of the present embodiment includes a reaction liquid application apparatus 14 and an ink application apparatus 15. A reaction liquid application apparatus having a roll coater is provided as the reaction liquid application apparatus 14. An inkjet device provided with an inkjet recording head is provided as the ink application apparatus. Such apparatuses are disposed in the listed order from the upstream towards the downstream in the rotation direction of the transfer member 11, and a reaction liquid is applied to an image formation surface of the transfer member 11 before ink application.

The inkjet device may include a plurality of inkjet recording heads. For example, when an yellow ink, a magenta ink, a cyan ink and a black ink are used to form respective color images, the inkjet device includes four inkjet recording heads that discharge the respective four inks onto the transfer member.

The air-blowing apparatus 16 is provided for liquid removal treatment that blows air to an ink image to remove at least a portion of a liquid component from the ink image.

The heating apparatus 17 includes a heater provided in the supporting member 12 and can heat the ink image from a region thereof closer to the image formation surface of transfer member 11 by the heating apparatus 17.

The pressing roller 19 and the drum-shaped supporting member 12 are used to form a pair of pressing rollers for transfer. The recording medium 18 can allowed to pass through a nip portion formed by contact of the outer periphery of the pressing roller 19 with the outer periphery of the drum-shaped supporting member 12 with being superimposed with the image formation surface of the transfer member 11, having the ink image, thereby allowing the ink image to be pressed and transferred onto the recording medium 18. The temperature in the transfer is applied by the heating apparatus 17. In the present embodiment, a transfer unit is formed by the pressing roller 19 as the pressing member for transfer and the supporting member 12 of the transfer member 11.

The cleaning unit 20 is used to clean the surface of the transfer member 11 for formation of the next ink image, when the transfer member 11 is repeatedly continuously used. In the present embodiment, a cleaning unit is provided which performs sweep away with a wetted Morton roller being abutted with the image formation surface of the transfer member, to thereby clean the image formation surface.

According to the present invention, a transfer member for transfer-type inkjet recording, which can be applied to image formation using an acid-containing reaction liquid and an ink and which is enhanced in durability in repeated use, can be provided. In addition, according to the present invention, an inkjet recording method and an inkjet recording apparatus using the transfer member can be provided.

EXAMPLES

Hereinafter, the present invention will be described in more detail with reference to Examples and Comparative Examples. The present invention is not intended to be limited to the following Examples, unless the present invention departs from the gist thereof. In addition, "%" and "part(s)" in the context are based on the mass, unless particularly noted.

In order to distinguish any material for transfer member production, any organosiloxane compound (condensate) prepared, any coating liquid prepared and any fluorine-containing silane compound added were marked with a lowercase alphabet character, an uppercase alphabet and a number, respectively.

Example 1

A transfer member having a layered structure illustrated in FIG. 1 was produced by stacking a reinforcement layer 104 including one woven fabric sheet of a cotton yarn having a thickness of 2.0 mm, a compression layer 103 including porous acrylonitrile/butadiene rubber having a thickness of 1.0 mm, a second reinforcement layer (not shown in figure) including a polyethylene terephthalate (PET) film having a thickness of 0.05 mm, an elastic layer 102 and a surface layer 101 in the listed order. Each of the elastic layer and the surface layer of the transfer member was produced as follows.

(Elastic Layer)

A material for silicone rubber formation was stacked on the compression layer 103 with the second reinforcement layer including the polyethylene terephthalate (PET) film having a thickness of 0.05 mm being interposed therebetween, and subjected to vulcanization to provide elastic layer including silicone rubber. The thickness of the elastic layer was 0.20 mm.

(Surface Layer)

(Preparation of Coating Liquid A Including Organosiloxane Compound (A))

A solution containing organosiloxane compound (a) obtained by mixing dimethyldiethoxysilane and glycidoxypropyldiethoxysilane at a molar ratio of 30:70 as each hydrolyzable organosilane compound, adding 2.4 mole equivalent of water based on the total molar number of the hydrolysable organosilane compounds, adding 500 ppm of acetic acid as a catalyst based on the total weight, subjecting the resultant to heating reflux for 24 hours at 100° C., and dehydrogenating the hydrolysable organosilane compounds was obtained. The solution was diluted with an ethanol/methyl isobutyl ketone mixed solvent (weight ratio: 4/1) so that the content of the organosiloxane compound (a) is 27% by mass, and 3% by mol of bis(triethoxysilylpropyl) poly-ethylene oxide based on the molar number of the organosiloxane compound (a) and 3% by mol of a photo cationic polymerization initiator CPI-410S (trade name, produced by San-Apro Ltd.) based on the molar number of the organosiloxane compound (a) were added thereto to prepare coating liquid A. The constitutional component of the coating liquid A, reaction conditions at the time of obtaining the organosiloxane compound (a), and the degree of condensation of the organosiloxane compound (a) are shown in Table 1. The degree of condensation of the organosiloxane compound in Table 1 was determined according to a $^{29}$Si NMR method using a nuclear magnetic resonance (NMR) apparatus (apparatus name: Avance 500, manufactured by Bruker Japan K.K.). Further, in Table 1, DIVIDES means diethyldiethoxysilane, GPMDES means glycidoxypropyldiethoxysilane, PhMDES means phenylmethyldiethoxysilane, $CF_3TMS$ means trimethoxy(3,3,3-trifluoropropyl)silane, $C_4F_9TES$ means triethoxy (1H,1H,2H,2H-nonafluorohexyl)silane, and $C_6F_{13}TES$ means triethoxy-1H,1H,2H,2H-tridecafluoro-n-octylsilane.

(Formation of Surface Layer)

An elastic layer subjected to plasma surface treatment was spin coated with coating liquid A to form a film. Next, the film was exposed by irradiation from an UV lamp (apparatus name: FUSION LIGHT HAMMER, manufactured by Alpha US Systems, peak wavelength: 365 nm, Integral of light: 1740 mJ/cm$^2$), and thereafter heated at 150° C. for 2 hours and thus cured to form a surface layer. Herein, a surface layer having a thickness of 0.15 mm was formed by controlling the number of rotations in the spin coating, to provide a transfer member A. The surface layer of the resulting transfer member was confirmed to include an organosiloxane compound having a polyalkylene oxide unit.

(Contact Angle Measurement on Surface of Transfer Member)

The contact angle of water and the contact angle of hexadecane on the surface of the transfer member were measured by an automatic contact angle meter (apparatus name: automatic contact angle meter CA-W, manufactured by Kyowa Interface Science Co., Ltd.). As known, the contact angle of water is an index for measurement of hydrophilicity. In the present invention, hexadecane means n-hexadecane. Hexadecane is an alkane having a long chain and does not have any hydrogen bindability serving as a source of hydrophilicity, and therefore commonly serves as an index for measurement of oil repellency. In the present invention, the contact angle on the surface of the transfer member means the contact angle with a surface of the transfer member, the surface being closer to the surface layer. Accordingly, the contact angle on the surface of the transfer member can also be referred to as the "contact angle on the surface of the surface layer" or the "contact angle of the image formation surface of the transfer member".

<Image Formation>

The transfer member obtained by the above method was evaluated with respect to items described below by use of the transfer-type inkjet recording apparatus illustrated in FIG. 2. A cylindrical drum made of an aluminum alloy was used as the supporting member of the transfer member.

A reaction liquid having the following composition was continuously applied to the surface of the transfer member by use of a roller type coating apparatus.

In the present Example, citric acid was used as an organic acid.

citric acid: 20.0 parts
glycerin: 5.0 parts
Megafac F-444 (trade name, produced by DIC Corporation): 1.0 part
ion-exchange water: 74.0 parts Subsequently, an ink for image formation was discharged through an inkjet device to the image formation surface of the transfer member, to form an ink image (mirror-reversed image) on the transfer member. In ejection pattern of the ink image, 100% solid image pattern in which the solid image having 200 recording duty is formed in the area of 1 cm×1 cm. Additionally, in the image recording apparatus of the present invention, 100% recording duty is defined as the conditions that one drop of 3.0 ng of the ink is dropped to the unit area of 1/1.200 inch×1/1.200 inch by 1.200 dpi× 1.200 dpi of resolution. The inkjet device used was a device for performing ink discharge by use of an electrothermal transducer in an on-demand system. The ink used was a resin dispersion-type pigment ink having the following composition.

C.I. Pigment blue 15:3:3.0 parts
styrene-acrylic acid-ethyl acrylate copolymer (acid value: 240, weight average molecular weight: 50000): 1.0 part
glycerin: 10.0 parts
ethylene glycol: 5.0 parts
Acetylenol E100 (trade name, produced by Kawaken Fine Chemicals Co., Ltd.): 0.5 parts
ion-exchange water: 80.5 parts Coated paper (trade name: Aurora Coat, manufactured by Nippon Paper Industries Co., Ltd., basis weight; 73.5 g/m$^2$) was used as a recording medium, and an ink image was pressure-bonded and transferred to the recording medium, to thereby form a final image. Such transfer was performed at a rate of 1.0 m/sec 50000 times. Cleaning here was performed by a method including performing sweep away with a wetted Morton roller being abutted with the surface of the transfer member.

Examples 2 to 10 and Comparative Examples 1 to 8

As described in the Table 1, each transfer member B to U was produced in the same manner as in Example 1 by use of each coating liquid B to U described below, instead of coating liquid A, and was evaluated using the transfer-type inkjet recording apparatus illustrated in FIG. 2.

(Preparation of Coating Liquid B Including Organosiloxane Compound (B))

Coating liquid B including organosiloxane compound (b) was prepared in the same manner as the preparation of coating liquid A including organosiloxane compound (a), except that dimethyldiethoxysilane and glycidoxypropyldiethoxysilane were mixed at a molar ratio of 50:50.

(Preparation of Coating Liquid C Including Organosiloxane Compound (C))

Coating liquid C including organosiloxane compound (c) was prepared in the same manner as the preparation of coating liquid A including organosiloxane compound (a), except that dimethyldiethoxysilane and glycidoxypropyldiethoxysilane were mixed at a molar ratio of 70:30.

(Preparation of Coating Liquid D Including Organosiloxane Compound (D))

Coating liquid D including organosiloxane compound (d) was prepared in the same manner as the preparation of coating liquid A including organosiloxane compound (a), except that dimethyldiethoxysilane and glycidoxypropyldiethoxysilane were mixed at a molar ratio of 70:30 and the heating reflux was for 3 hours at 80° C.

(Preparation of Coating Liquid E Including Organosiloxane Compound (E))

Coating liquid E including organosiloxane compound (e) was prepared in the same manner as the preparation of coating liquid A including organosiloxane compound (a), except that dimethyldiethoxysilane, glycidoxypropyldiethoxysilane, and phenylmethyldiethoxysilane were mixed at a molar ratio of 40:30:30.

(Preparation of Coating Liquid F Including Organosiloxane Compound (C))

A solution containing organosiloxane compound (c) was diluted with an ethanol/methyl isobutyl ketone mixed solvent (weight ratio: 4/1) so that the content of the organosiloxane compound (c) is 27% by mass, and 30% by mol of Denacol EX-991L (trade name, Nagase ChemteX Corporation) based on the molar number of the organosiloxane compound (c) and 7.5% by mol of a photo cationic polymerization initiator CPI-410S (trade name, produced by San-Apro Ltd.) based on the molar number of the organosiloxane compound (c) were added thereto to prepare coating liquid F.

(Preparation of Coating Liquid G Including Organosiloxane Compound (F))

Coating liquid G including organosiloxane compound (f) was prepared in the same manner as the preparation of coating liquid A including organosiloxane compound (a), except that dimethyldiethoxysilane, glycidoxypropyldiethoxysilane and trimethoxy(3,3,3-trifluoropropyl)silane (1) (produced by Tokyo Chemical Industry Co., Ltd., Model: T2720) were mixed as the hydrolyzable organosilane compound at a molar ratio of 67:30:3.

(Preparation of Coating Liquid H Including Organosiloxane Compound (G))

Coating liquid H including organosiloxane compound (g) was prepared in the same manner as the preparation of coating liquid A including organosiloxane compound (a), except that dimethyldiethoxysilane, glycidoxypropyldiethoxysilane and triethoxy (1H,1H,2H,2H-nonafluorohexyl)silane (2) (produced by Tokyo Chemical Industry Co., Ltd., Model: T2860) were mixed as the hydrolyzable organosilane compound at a molar ratio of 67:30:3.

(Preparation of Coating Liquid I Including Organosiloxane Compound (H))

Coating liquid I including organosiloxane compound (h) was prepared in the same manner as the preparation of coating liquid A including organosiloxane compound (a), except that dimethyldiethoxysilane, glycidoxypropyldiethoxysilane and triethoxy-1H,1H,2H,2H-tridecafluoro-n-octylsilane (3) (produced by Tokyo Chemical Industry Co., Ltd., Model: T1770) were mixed as the hydrolyzable organosilane compound at a molar ratio of 69:30:1.

(Preparation of Coating Liquid J including Organosiloxane Compound (I))

Coating liquid J including organosiloxane compound (i) was prepared in the same manner as the preparation of coating liquid A including organosiloxane compound (a), except that dimethyldiethoxysilane, glycidoxypropyldiethoxysilane and triethoxy-1H,1H,2H,2H-tridecafluoro-n-octylsilane (3) (produced by Tokyo Chemical Industry Co., Ltd., Model: T1770) were mixed as the hydrolyzable organosilane compound at a molar ratio of 68.5:30:1.5.

(Preparation of Coating Liquid K Including Organosiloxane Compound (J))

Coating liquid K including organosiloxane compound (j) was prepared in the same manner as the preparation of coating liquid A including organosiloxane compound (a), except that dimethyldiethoxysilane, glycidoxypropyldiethoxysilane phenylmethyldiethoxysilane and triethoxy-1H,1H,2H,2H-tridecafluoro-n-octylsilane (3) (produced by Tokyo Chemical Industry Co., Ltd., Model: T1770) were mixed as the hydrolyzable organosilane compound at a molar ratio of 39:30:30:1.

(Preparation of Coating Liquid L Including Organosiloxane Compound (H))

Coating liquid L including organosiloxane compound (h) was prepared in the same manner as the preparation of coating liquid F except that organosiloxane compound (h) was used as organosiloxane compound.

(Preparation of Coating Liquid M Including Organosiloxane Compound (H))

Coating liquid M including organosiloxane compound (h) was prepared in the same manner as the preparation of coating liquid L except that 50% by mol of Denacol EX-991L (trade name, Nagase ChemteX Corporation) based on the molar number of the organosiloxane compound (h) was used.

(Preparation of Coating Liquid N Including Organosiloxane Compound (k))

Coating liquid N including organosiloxane compound (k) was prepared in the same manner as the preparation of coating liquid A, except that the heating reflux time was 3 hours at 80° C.

(Preparation of Coating Liquid O Including Organosiloxane Compound (1))

Coating liquid O including organosiloxane compound (l) was prepared in the same manner as the preparation of coating liquid B, except that the heating reflux time was 3 hours at 80° C.

(Preparation of Coating Liquid P Including Organosiloxane Compound (M))

Coating liquid P including organosiloxane compound (m) was prepared in the same manner as the preparation of coating liquid H including organosiloxane compound (g), except that dimethyldiethoxysilane, glycidoxypropyldiethoxysilane and triethoxy (1H,1H,2H,2H-nonafluorohexyl) silane (2) were mixed as the hydrolyzable organosilane compound at a molar ratio of 65:30:5.

(Preparation of Coating Liquid Q Including Organosiloxane Compound (N))

Coating liquid Q including organosiloxane compound (n) was prepared in the same manner as the preparation of coating liquid I including organosiloxane compound (h), except that dimethyldiethoxysilane, glycidoxypropyldiethoxysilane and triethoxy-1H,1H,2H,2H-tridecafluoro-n-octylsilane (3) were mixed as the hydrolyzable organosilane compound at a molar ratio of 68:30:2.

(Preparation of Coating Liquid R Including Organosiloxane Compound (B))

Coating liquid R including organosiloxane compound (b) was prepared in the same manner as the preparation of coating liquid B including organosiloxane compound (b), except that SP150 (produced by ADEKA Corporation) was used as the photo cationic polymerization.

(Preparation of Coating Liquid S Including Organosiloxane Compound (O))

Coating liquid S including organosiloxane compound (o) was prepared in the same manner as the preparation of coating liquid A including organosiloxane compound (a) except that methyltriethoxysilane and glycidoxypropyldiethoxysilane were mixed at a molar ratio of 50:50.

(Preparation of Coating Liquid T Including Organosiloxane Compound (P))

Coating liquid T including organosiloxane compound (p) was prepared by using 4,4,15,15-tetramethoxy-7,7,8,8,9,9,10,10,11,11,12,12-dodecafluoro-3,16-dioxa-4,15-disilaoctadecane (4) (produced by abcr GmbH) as the hydrolyzable organosilane compound (p) and diluting the hydrolyzable organosilane compound (p) with an ethanol/methyl isobutyl ketone mixed solvent (weight ratio: 4/1) so that the content of the hydrolyzable organosilane compound (p) is 27% by mass.

(Preparation of Coating Liquid U Including Organosiloxane Compound (Q))

Coating liquid U including organosiloxane compound (q) was prepared in the same manner as the preparation of coating liquid A including organosiloxane compound (a), except that 4,4,15,15-tetramethoxy-7,7,8,8,9,9,10,10,11,11,12,12-dodecafluoro-3,16-dioxa-4,15-disilaoctadecane (4), triethoxy-1H,1H,2H,2H-tridecafluoro-n-octylsilane (3) and tetraethoxysilane (produced by Wako Pure Chemical Industries) were mixed as the hydrolyzable organosilane compound at a molar ratio of 30:30:40.

Hereinafter, Table 2 represents the the coating liquid and the contact angle of the transfer member used in each of Examples 1 to 13 and Comparative Examples 1 to 8, and Table 3 represents the evaluation results in Examples 1 to 13 and Comparative Examples 1 to 8. Evaluation with respect to resistance to contact with an acid liquid, image formability, transferability and durability was performed according to the following criteria.

(Evaluation of Resistance to Contact with Acid Liquid)

Each of the contact angle of water and the contact angle of hexadecane on the transfer member surface was measured by an automatic contact angle meter (apparatus name: automatic contact angle meter CA-W, manufactured by Kyowa Interface Science Co., Ltd.), and thereafter the surface was coated with the organic acid-containing reaction liquid having the composition and heated on a hot plate at 120° C. for 50 minutes. Thereafter, the reaction liquid on the surface was washed with water, the transfer member was dried to measure the contact angle of water and the contact angle of hexadecane on the surface by an automatic contact angle meter (apparatus name: automatic contact angle meter CA-W, manufactured by Kyowa Interface Science Co., Ltd.), and the amount of change in each of the contact angles was evaluated according to the following criteria. Here, the amounts of a water droplet and a hexadecane droplet in such measurement were 3 μL and 6 μL, respectively.

Change in Contact Angle of Water

A: the change in contact angle was 5° or less.

B: the change in contact angle was more than 5° and 10° or less.

C: the change in contact angle was more than 10°.

Change in Contact Angle of Hexadecane

A: the change in contact angle was 2° or less.

B: the change in contact angle was more than 2° and 5° or less.

C: the change in contact angle was more than 5°.

The resistance to contact with an acid liquid was evaluated from the resulting evaluation with respect to the change in contact angle of each of water and hexadecane, according to the following criteria.

A: both of the evaluation results of the change in contact angles of water and hexadecane were rated as "A"

B: both of the evaluation results of the change in contact angles of water and hexadecane were not rated as "C" and at least any one thereof was rated as "B"

C: any one of the evaluation results of the change in contact angles of water and hexadecane was rated as "C"

D: both of the evaluation results of the change in contact angles of water and hexadecane were rated as "C"

(Evaluation of Image Formability)

In the first ink image formation, the coatability of the transfer member surface (image formation surface) with the reaction liquid, closely related to the image quality of an ink image, and image quality of the ink image formed on the transfer member were observed with an optical microscope, and evaluated according to the following criteria.

A: no repelling of the reaction liquid was observed and coating was uniformly made, and a high-quality ink image was favorably formed.
B: slight repelling of the reaction liquid was observed, but the image quality of the ink image was sufficient.
C: repelling of the reaction liquid was observed and the image quality of a part of the ink image was not sufficient.
D: remarkable repelling of the reaction liquid was observed and the entire image quality of the ink image was not sufficient.

(Evaluation of Transferability)

In the first ink image formation, the image quality of each of the ink image on the transfer member and the final image formed on the recording medium after transfer was observed with an optical microscope, and evaluated according to the following criteria. Here, the transfer in the present evaluation was performed in a condition of a transfer member temperature of 90° C.

A: no remaining ink image was observed on the transfer member and the final image was also favorably formed.
B: any remaining ink image was slightly observed on the transfer member, but the image quality of the final image was sufficient.
C: any remaining ink image was somewhat observed on the transfer member and a part of the final image was not sufficiently transferred.
D: any remaining ink image was observed on the transfer member and the entire of the final image was not sufficiently transferred.

(Durability)

The frequency of cracking of the surface of the transfer member after the transfer 50000 times was observed with an optical microscope, and evaluated according to the following criteria.

A: no occurrence of cracking was observed on the surface of the transfer member.
B: the occurrence of cracking was slightly observed on the surface of the transfer member.
C: the occurrence of cracking was observed on the surface of the transfer member.
D: the occurrence of cracking was largely observed on the surface of the transfer member.

TABLE 1

| Type of coating liquid | Organosiloxane compound | | | | | | | | Reaction condition |
|---|---|---|---|---|---|---|---|---|---|
| | Type | Mole ratio of hydrolyzable organosilane compound | | | | | | | Temp. [° C.] |
| | | DMDES | GPMDES | PhMDES | $CF_3TMS$ | $C_4F_9TES$ | $C_6F_{13}TES$ | MTES | |
| A | (a) | 30 | 70 | — | — | — | — | — | 100 |
| B | (b) | 50 | 50 | — | — | — | — | — | 100 |
| C | (c) | 70 | 30 | — | — | — | — | — | 100 |
| D | (d) | 70 | 30 | — | — | — | — | — | 80 |
| E | (e) | 40 | 30 | 30 | — | — | — | — | 100 |
| F | (c) | 70 | 30 | — | — | — | — | — | 100 |
| G | (f) | 67 | 30 | — | 3 | — | — | — | 100 |
| H | (g) | 67 | 30 | — | — | 3 | — | — | 100 |
| I | (h) | 69 | 30 | — | — | — | 1 | — | 100 |
| J | (i) | 68.5 | 30 | — | — | — | 1.5 | — | 100 |
| K | (j) | 39 | 30 | 30 | — | — | 1 | — | 100 |
| L | (h) | 69 | 30 | — | — | — | 1 | — | 100 |
| M | (h) | 69 | 30 | — | — | — | 1 | — | 100 |
| N | (k) | 30 | 70 | — | — | — | — | — | 80 |
| O | (l) | 50 | 50 | — | — | — | — | — | 80 |
| P | (m) | 65 | 30 | — | — | 5 | — | — | 100 |
| Q | (n) | 68 | 30 | — | — | — | 2 | — | 100 |
| R | (b) | 50 | 50 | — | — | — | — | — | 100 |
| S | (o) | — | 50 | — | — | — | — | 50 | 100 |
| T | (p) | | | | see specificatio | | | | |
| U | (q) | | | | see specification | | | | |

| Type of coating liquid | Organosioxane compound | | Polymerizable compound having polyalkylene oxide | | Polymerization initiator |
|---|---|---|---|---|---|
| | Reaction condition Time[h] | Condensation degree [%] | Bis(triethoxysilylpropyl)polyethyleneoxide | Denacol EX-991L | |
| A | 24 | 52 | 3 | — | CPI-410S |
| B | 24 | 56 | 3 | — | CPI-410S |
| C | 24 | 63 | 3 | — | CPI-410S |
| D | 3 | 41 | 3 | — | CPI-410S |
| E | 24 | 59 | 3 | — | CPI-410S |
| F | 24 | 63 | — | 30 | CPI-410S |
| G | 24 | 63 | 3 | — | CPI-410S |
| H | 24 | 58 | 3 | — | CPI-410S |
| I | 24 | 53 | 3 | — | CPI-410S |
| J | 24 | 52 | 3 | — | CPI-410S |
| K | 24 | 54 | 3 | — | CPI-410S |
| L | 24 | 53 | — | 30 | CPI-410S |

TABLE 1-continued

| | | | | | |
|---|---|---|---|---|---|
| M | 24 | 53 | — | 50 | CPI-410S |
| N | 3 | 40 | 3 | — | CPI-410S |
| O | 3 | 39 | 3 | — | CPI-410S |
| P | 24 | 50 | 3 | — | CPI-410S |
| Q | 24 | 48 | 3 | — | CPI-410S |
| R | 24 | 56 | 3 | — | SP150 |
| S | 24 | 61 | 3 | — | CPI-410S |
| T | | | see specificatio | | |
| U | | | see specification | | |

TABLE 2

| Example | Coating liquid No. | Transfer member No. | Contact angle [°] Water | Contact angle [°] Hexadecane |
|---|---|---|---|---|
| Example 1 | A | A | 85 | 26 |
| Example 2 | B | B | 87 | 28 |
| Example 3 | C | C | 91 | 31 |
| Example 4 | D | D | 86 | 25 |
| Example 5 | E | E | 86 | 33 |
| Example 6 | F | F | 89 | 38 |
| Example 7 | G | G | 88 | 42 |
| Example 8 | H | H | 101 | 50 |
| Example 9 | I | I | 106 | 48 |
| Example 10 | J | J | 110 | 49 |
| Example 11 | K | K | 100 | 45 |
| Example 12 | L | L | 98 | 48 |
| Example 13 | M | M | 95 | 46 |
| Comparative Example 1 | N | N | 83 | 25 |
| Comparative Example 2 | O | O | 85 | 23 |
| Comparative Example 3 | P | P | 105 | 51 |
| Comparative Example 4 | Q | Q | 117 | 50 |
| Comparative Example 5 | R | R | 83 | 33 |
| Comparative Example 6 | S | S | 69 | 19 |
| Comparative Example 7 | T | T | 116 | 64 |
| Comparative Example 8 | U | U | 107 | 59 |

TABLE 3

| | Evaluation | | | |
|---|---|---|---|---|
| Example | Resistance to contact with acid liquid | Image formability | Transferability | Durability |
| Example 1 | B | A | B | B |
| Example 2 | B | A | B | B |
| Example 3 | B | A | B | B |
| Example 4 | B | A | B | B |
| Example 5 | B | A | B | B |
| Example 6 | B | A | A | A |
| Example 7 | A | A | B | A |
| Example 8 | A | B | A | B |
| Example 9 | A | B | A | A |
| Example 10 | A | B | A | A |
| Example 11 | A | A | A | A |
| Example 12 | A | B | A | A |
| Example 13 | A | B | B | A |
| Comparative Example 1 | C | A | C | B |
| Comparative Example 2 | C | A | C | B |
| Comparative Example 3 | A | C | A | B |
| Comparative Example 4 | A | D | A | A |
| Comparative Example 5 | B | A | C | B |
| Comparative Example 6 | C | A | B | D |
| Comparative Example 7 | A | C | A | C |
| Comparative Example 8 | A | C | A | D |

As represented in Table 3, all the transfer members of Example 1 to 13 achieved good results with respect to the four items evaluated, and exhibited sufficient performance as a transfer member. The resistance to contact with an acid liquid tended to be enhanced in the case of higher oil repellency, and good results were obtained in Examples 7 to 13 where a small amount of the fluorinated organosilane compound was added to increase the contact angle of hexadecane.

With respect to the image formability, a higher-quality image could be formed as the hydrophilicity was higher, and a good image formability was achieved in the transfer member of each of Examples 1 to 6 where no fluorinated organosilane compound was used and the contact angle of water was adjusted by the epoxy rate.

On the other hand, the transferability was in a trade-off relationship with the image formability and the transferability tended to be enhanced as the contact angle of water was larger. In Example 6 and Examples 12 to 13, when the type of the compound having a polymerizable group for application of flexibility was changed and the compounding ratio thereof was increased, the contribution of the compound having a polymerizable group for application of flexibility was increased to thereby result in an enhancement in durability.

In addition, when a reactive moiety was largely present as in the organosilane compound used in each of Comparative Examples 6 and 7, the organosilane compound was increased in crosslinking and hardened, and thus deteriorated in durability was observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-138564, filed Jul. 14, 2017, which is hereby incorporated by reference herein in its entirety.

What is claimed is:

1. A transfer member for transfer-type inkjet recording, comprising a surface layer, wherein:
   the surface layer comprises an organosiloxane compound that has a polyalkylene oxide unit and is a condensate of a hydrolyzable organosilane compound comprising a hydrolyzable organosilane compound having a perfluoroalkyl group;
   a contact angle of water on a surface of the transfer member is 85° to 110°; and
   a contact angle of hexadecane on the surface of the transfer member is 25° to 50°.

2. The transfer member according to claim 1, wherein the transfer member is for heating transfer.

3. The transfer member according to claim 1, wherein the transfer member further comprises a base layer.

4. The transfer member according to claim 1, wherein the contact angle of water is 85° to 100°.

5. The transfer member according to claim 1, wherein the contact angle of hexadecane is 25° to 42°.

6. The transfer member according to claim 1, wherein the polyalkylene oxide unit has a structure represented by formula (I):

$$-(-(CH_2)_m-O)_n-\quad (I),$$

wherein m represents 4 to 12 and n represents 1 to 120.

7. An inkjet recording method comprising:
   applying a reaction liquid containing an acid onto an image formation surface of a transfer member;
   applying an ink onto the image formation surface of the transfer member, to form an ink image; and
   transferring the ink image from the transfer member to a recording medium, wherein the transfer member is the transfer member according to claim 1.

8. The inkjet recording method according to claim 7, comprising heating the ink image on the transfer member.

9. An inkjet recording apparatus comprising:
   a transfer member;
   an image forming unit comprising a reaction liquid application apparatus that applies a reaction liquid containing an acid onto an image formation surface of the transfer member and an ink application apparatus that applies an ink onto the image formation surface of the transfer member to thereby form an ink image; and
   a transfer unit that transfers the ink image from the transfer member to a recording medium,
   wherein the transfer member is the transfer member according to claim 1.

10. The inkjet recording apparatus according to claim 9, comprising a heating apparatus that heats the ink image on the transfer member.

* * * * *